(12) United States Patent
Kim et al.

(10) Patent No.: US 10,559,785 B2
(45) Date of Patent: Feb. 11, 2020

(54) SEALING APPARATUS FOR SECONDARY BATTERY

(71) Applicant: LG CHEM, LTD., Seoul (KR)

(72) Inventors: Cho Long Kim, Daejeon (KR); Yong Su Choi, Daejeon (KR); Sang Hun Kim, Daejeon (KR); Sang Suk Jung, Daejeon (KR); Won Pill Hwang, Daejeon (KR); Yong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 120 days.

(21) Appl. No.: 15/736,475

(22) PCT Filed: Sep. 29, 2016

(86) PCT No.: PCT/KR2016/010936
§ 371 (c)(1),
(2) Date: Dec. 14, 2017

(87) PCT Pub. No.: WO2017/086593
PCT Pub. Date: May 26, 2017

(65) Prior Publication Data
US 2018/0190951 A1    Jul. 5, 2018

(30) Foreign Application Priority Data

Nov. 18, 2015  (KR) .......................... 10-2015-0162044
Sep. 23, 2016  (KR) .......................... 10-2016-0122460

(51) Int. Cl.
*H01M 2/06* (2006.01)
*H01M 10/04* (2006.01)
(Continued)

(52) U.S. Cl.
CPC ............... *H01M 2/06* (2013.01); *H01M 2/08* (2013.01); *H01M 2/26* (2013.01); *H01M 10/04* (2013.01);
(Continued)

(58) Field of Classification Search
CPC combination set(s) only.
See application file for complete search history.

(56) References Cited

U.S. PATENT DOCUMENTS

2002/0157242 A1   10/2002  Fukuda et al.
2006/0188777 A1*   8/2006  Kaneta .................. H01M 2/266
                                                                     429/128
(Continued)

FOREIGN PATENT DOCUMENTS

EP     1 667 251 A1    6/2006
JP     1-213955 A      8/1989
(Continued)

OTHER PUBLICATIONS

European Search Report for Appl. No. 16866546.1 dated Feb. 13, 2018.
(Continued)

*Primary Examiner* — Maria Laios
(74) *Attorney, Agent, or Firm* — Mintz Levin Cohn Ferris Glovsky and Popeo, P.C.; Steven M. Jensen (57) ABSTRACT

The present invention relates to a sealing apparatus sealing a sealing part of a battery case at which an electrode lead coupled to an electrode assembly is disposed. The sealing apparatus comprises: a thermal fusion member applying heat and a pressure to the sealing part of the battery case, at which the electrode lead is disposed, to seal the sealing part; and a temperature rising prevention member supported on a front end of the electrode lead to cool the sealing part through the electrode lead, thereby preventing the sealing part from increasing in temperature.

10 Claims, 7 Drawing Sheets

(51) Int. Cl.
  *H01M 2/08* (2006.01)
  *H01M 2/26* (2006.01)
  *H01M 10/6551* (2014.01)
  *H01M 2/02* (2006.01)

(52) U.S. Cl.
  CPC ...... *H01M 10/6551* (2015.04); *H01M 2/0277* (2013.01)

(56) References Cited

U.S. PATENT DOCUMENTS

| | | | | |
|---|---|---|---|---|
| 2006/0194103 | A1* | 8/2006 | Otohata | H01G 9/016 429/185 |
| 2014/0186677 | A1 | 7/2014 | Lim | |
| 2016/0111750 | A1 | 4/2016 | Tanida et al. | |

FOREIGN PATENT DOCUMENTS

| | | |
|---|---|---|
| JP | 2006-004687 A | 1/2006 |
| JP | 2008-146942 A | 6/2008 |
| JP | 2009-272161 A | 11/2009 |
| KR | 10-2001-0110686 A | 12/2001 |
| KR | 10-0958649 B1 | 5/2010 |
| KR | 10-2014-0039350 A | 4/2014 |
| KR | 10-2014-0089067 A | 7/2014 |
| KR | 10-2014-0090335 A | 7/2014 |
| KR | 10-2015-0045168 A | 4/2015 |
| WO | 2015012195 A1 | 1/2015 |

OTHER PUBLICATIONS

International Search Report issued in PCT/KR2016/010936 (PCT/ISA/210), dated Jan. 10, 2017.

* cited by examiner

SEALING APPARATUS FOR SECONDARY BATTERY

CROSS-REFERENCE TO RELATED APPLICATION

The present application claims the benefit of the priority of Korean Patent Application Nos. 10-2015-0162044, filed on Nov. 18, 2015, and 10-2016-0122460, filed on Sep. 23, 2016, which are hereby incorporated by reference in their entirety.

TECHNICAL FIELD

The present invention relates to a sealing apparatus for a secondary battery, and more particularly, to a sealing apparatus for a secondary battery, which improves sealability with respect to a sealing part of a battery case at which an electrode lead is disposed.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

A secondary battery comprises an electrode assembly provided with an electrode tab, an electrode lead coupled to the electrode tab of the electrode assembly, a battery case accommodating the electrode assembly in a state in which a front end of the electrode lead is exposed to the outside, and a lead film surrounding the electrode lead disposed on a sealing part of the battery case.

In the secondary battery, when the sealing part of the battery case in which the electrode assembly is accommodated is thermally fused to be sealed, a sealing apparatus is used.

However, in the sealing apparatus for the secondary battery, when the sealing part at which the electrode lead is disposed is thermally fused, a heat source may not be released to the outside to cause oversealing of the sealing part. Particularly, the sealing part may be oversealed to damage an insulation film, thereby causing insulation failures.

The present invention has been made to solve the above problems, an object of the present invention is to provide a sealing apparatus in which a heat source generated in a sealing part is released to the outside through an electrode lead when the sealing part at which the electrode lead is disposed is thermally fused, to prevent oversealing of the sealing part and insulation failures from occurring.

Technical Solution

To achieve the abovementioned object, a sealing apparatus for a secondary battery, which seals a sealing part of a battery case at which an electrode lead coupled to an electrode assembly is disposed, according to the present invention comprises: a thermal fusion member applying heat and a pressure to the sealing part of the battery case, at which the electrode lead is disposed, to seal the sealing part; and a temperature rising prevention member supported on a front end of the electrode lead to cool the sealing part through the electrode lead, thereby preventing the sealing part from increasing in temperature.

The temperature rising member may release heat of the sealing part to the outside through the electrode lead to cool the sealing part.

The temperature rising prevention member may cool the sealing part by using cool air generated by cooling the electrode lead.

The temperature rising prevention member may support the front end of the electrode lead at a temperature less than that of the thermal fusion member.

The temperature rising prevention member may be provided with a first heat dissipation piece and a second heat dissipation piece, which respectively support both side surfaces of the front end of the electrode lead.

The first heat dissipation piece may have a temperature less than that of the thermal fusion member, and the second heat dissipation piece may have a temperature less than that of the first heat dissipation piece.

The first heat dissipation piece may support one side surface of the front end of the electrode lead, and after a preset time elapses, the second heat dissipation piece may support the other side surface of the front end of the electrode lead.

The preset time may range of 1 second to 5 seconds.

The temperature rising prevention member may further support the front end of the electrode lead for 1 second to 5 seconds after the thermal fusion member is separated from the sealing part.

The thermal fusion member may be separated from the sealing part, and simultaneously, the second heat dissipation piece may be separated from the front end of the electrode lead, wherein the first heat dissipation piece may further support the front end of the electrode lead for 1 second to 5 seconds to cool the sealing part.

Advantageous Effects

The present invention has effects as follows.

First: the sealing apparatus for the secondary battery according to the present invention comprises the temperature rising prevention member supported on the electrode lead to cool the sealing part through the electrode lead and thereby to prevent the sealing part from increasing in temperature, thereby preventing the oversealing of the sealing part and the insulation failures from occurring.

Second: the temperature rising prevention member according to the present invention may release the heat of the sealing part to the outside through the electrode lead to effectively cool the sealing part.

Third: the temperature rising prevention member according to the present invention may effectively cool the sealing part by using the cool air generated by cooling the electrode lead.

Fourth: the temperature rising prevention member according to the present invention may be provided with the first heat dissipation piece and the second heat dissipation piece, which are different from each other, to more effectively release the heat generated in the sealing part.

Fifth: in the first dissipation piece and the second dissipation piece provided in the temperature rising prevention member according to the present invention, the first heat dissipation piece may be supported on the electrode lead to release the low-temperature heat generated during the initial thermal fusion to the outside, and then, the second heat dissipation piece having a temperature less than that of the first heat dissipation piece may be supported on the electrode lead to release the high-temperature heat after the sealing part is thermally fused to the outside.

Sixth: the temperature rising prevention member according to the present invention may be supported on the electrode lead even after the sealing part is thermally fused to cool the sealing part, thereby preventing the oversealing of the sealing part due to the heat remaining in the sealing part and the insulation failures from occurring.

BRIEF DESCRIPTION OF THE DRAWINGS

FIGS. 3 to 5 are views illustrating a use state of the sealing apparatus for the secondary battery according to an embodiment of the present invention.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 1:
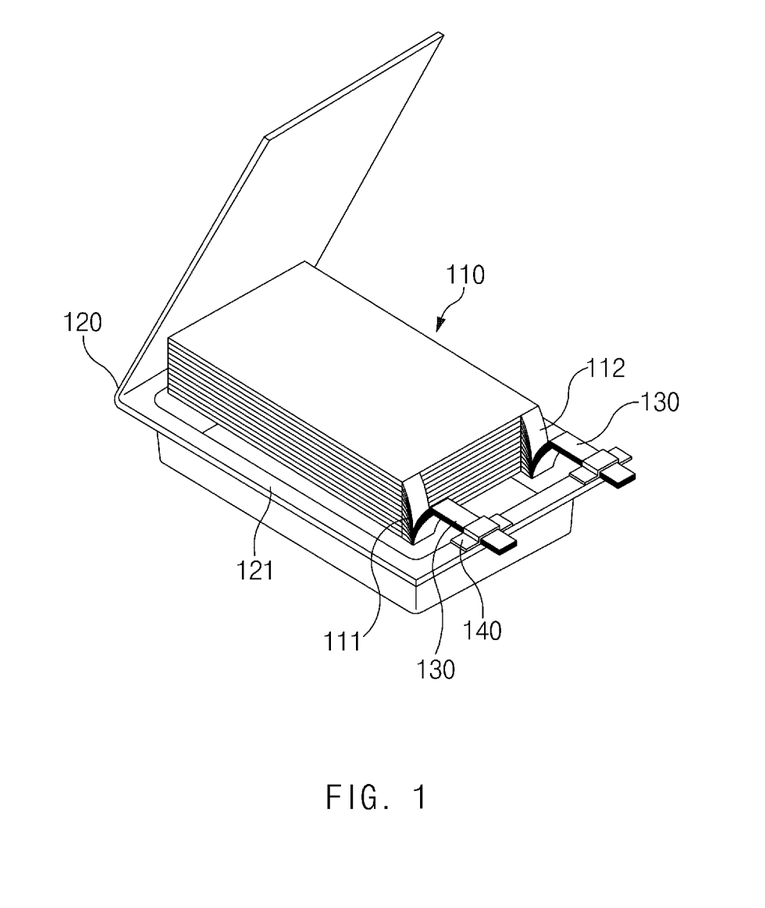
FIG. 1 is a perspective view of a secondary battery according to an embodiment of the present invention.

As illustrated in FIG. 1, a secondary battery according to an embodiment of the present invention comprises an electrode assembly 110 provided with an electrode tab 111, an electrode lead 130 coupled to the electrode tab 111 of the electrode assembly 110, a battery case 120 accommodating the electrode assembly 110 in a state in which a front end of the electrode lead 130 is exposed to the outside, and a lead film 140 surrounding disposed on a sealing part 121 of the battery case 120.

In the secondary battery having the above-described constituents according to an embodiment of the present invention, the sealing part 121 is sealed to be airtight in a state in which the electrode assembly 110 is accommodated in the battery case 120. Here, a sealing apparatus 200 is used for sealing the sealing part 121.

Figure 2:
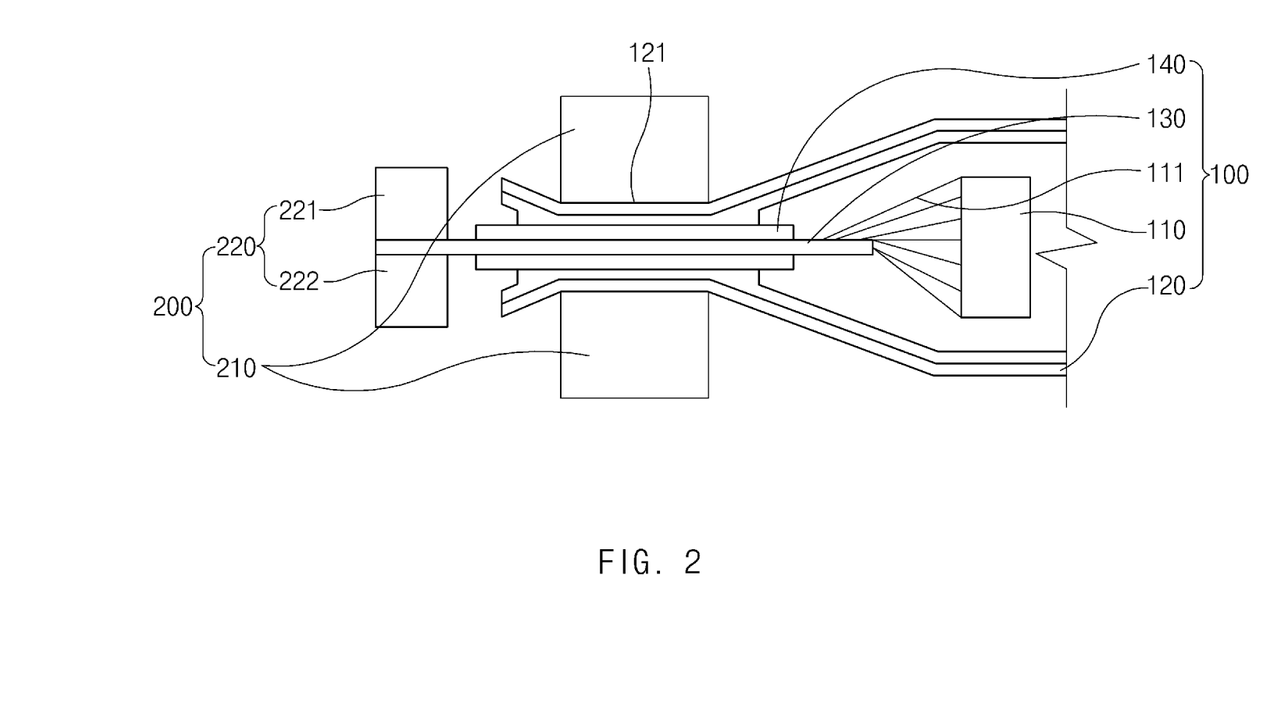
FIG. 2 is a cross-sectional view of a sealing apparatus for the secondary battery according to an embodiment of the present invention.

As illustrated in FIG. 2, the sealing apparatus 200 for the secondary battery according to an embodiment of the present invention comprises a thermal fusion member 210 sealing the sealing part 121 and a temperature rising prevention member 220 cooling heat generated in the sealing part 121 through the electrode lead 130 to prevent the sealing part 121 from increasing in temperature.

The thermal fusion member 210 comprises an upper sealing part and a lower sealing part, which apply heat and a pressure to top and bottom surfaces of the sealing part 121 at the same time to seal the sealing part 121.

The thermal fusion member 210 thermally fuses and seals the sealing part 121 of the battery case 120 at which the electrode lead 130 is disposed. Here, while the sealing part 121 increases in temperature, the sealing part 121 may be oversealed. Particularly, when an insulation film attached to an inner surface of the sealing part 121 is damaged, insulation failures may occur.

To solve the abovementioned problem, the temperature rising prevention member 220 cooling the sealing part 121 of the battery case 120 through the electrode lead 130 is provided.

Referring to FIG. 2, the temperature rising prevention member 220 may release the heat of the sealing part 121 to the outside through the electrode lead 130 to cool the sealing part 121. Thus, the sealing part 121 may be prevented from increasing in temperature and being oversealed.

Here, the temperature rising prevention member 220 supports a front end of the electrode lead 130 at a temperature less than that of heat generated in the thermal fusion member 210. That is, the temperature rising prevention member 220 has a temperature less than that of the heat generated in the sealing part 121 that is thermally fused by the thermal fusion member 210. Here, the heat generated in the sealing part 121 is stably released through the electrode lead 130.

The temperature rising prevention member 220 is provided with a first heat dissipation piece 221 and a second heat dissipation piece 222 to respectively support both side surfaces of the front end of the electrode lead 130. That is, the first heat dissipation piece 221 supports one side surface (a right top surface when viewed in FIG. 2) of the front end of the electrode lead 130, and the second heat dissipation piece 222 supports the other side surface (a right bottom surface when viewed in FIG. 2) of the front end of the electrode lead 130. Thus, the heat of the sealing part 121 disposed above and below the electrode lead 130 may be uniformly absorbed and then released to the outside to improve sealability of the sealing part 121.

The first heat dissipation piece 221 and the second heat dissipation piece 222 may have the same temperature or temperatures different from each other. That is, the first heat dissipation piece 221 may have a temperature less than that of the heat generated in the thermal fusion member 210, and the second heat dissipation piece 222 may have a temperature less than that of the first heat dissipation piece 221.

That is, only the first heat dissipation piece 221 having the temperature less than that of the heat generated in the thermal fusion member 210 may be supported on the electrode lead 130 at an initial period of the thermal fusion of the sealing part 121 through the thermal fusion member 210 to minimize the releasing of the heat generated in the sealing part 121. That is, when the heat of the sealing part 121 is excessively released at the initial period of the thermal fusion, the sealability may be deteriorated. Thus, the releasing of the heat of the sealing part 121 has to be minimized.

Thereafter, all of the first heat dissipation piece 221 and the second heat dissipation piece 222 are supported on the electrode lead 130 at a middle period of the thermal fusion of the sealing part 121 through the thermal fusion member 210, and thus, high-temperature heat generated in the sealing part 121 may be quickly released to the outside through the first heat dissipation piece 221 and the second heat dissipation piece 222 to prevent the sealing part 121 from being oversealed. Here, since the second heat dissipation piece 222 has a temperature less than that of the first heat dissipation piece 221, the heat generated in the sealing part 121 may be more quickly released to the outside.

In the temperature rising prevention member 220, the first heat dissipation piece 221 is supported on one side surface of the front end of the electrode lead 130 at the same time at which the thermal fusion member 210 thermally fuses the sealing part 121. After a preset time elapses, the second heat dissipation piece 222 is supported on the other side surface of the front end of the electrode lead 130 to more improve the sealability of the sealing part 121.

Here, the preset time may be 1 second to 5 seconds, particularly, 3 seconds. That is, the thermal fusion member 210 presses the sealing part 121 in a state of being heated. Here, when the second heat dissipation piece 222 supports the electrode lead 120 before 1 second elapses after the first heat dissipation piece 221 supports the electrode lead 130, the heat may be released in a state in which the sealing part 121 is not sealed to cause sealing failures. Also, when the second heat dissipation piece 222 supports the electrode lead 130 after 5 seconds elapses after the first heat dissipation piece 221 supports the electrode lead 130, the sealing part 121 may be oversealed to cause failures. Thus, the second heat dissipation piece 222 is supported on the electrode lead 130 within 1 second to 5 seconds after the second heat dissipation piece 222 supports the electrode lead 130 to improve the sealability of the sealing part 121 and prevent the sealing part 121 from being oversealed.

The temperature rising prevention member 220 further supports the front end of the electrode lead 130 for 1 second to 5 seconds to release heat even though the thermal fusion is completed, and the thermal fusion member 210 is separated from the sealing part 121. That is, although the thermal fusion is completed, the heat remains in the sealing part 121. Thus, the temperature rising prevention member 220 may completely release the heat remaining in the sealing part 121 to the outside, thereby improving the sealability.

After the thermal fusion is completed, when the heat remaining the sealing part 121 is quickly released to the outside, the sealing part 121 may be rapidly solidified to cause the sealing failures. Thus, in the temperature rising prevention member 220, the second heat dissipation piece 222 is separated first from the electrode lead 130, and then, the first heat dissipation piece 221 is separated from the electrode lead 130 after the preset time elapses so that the sealing part 121 is slowly solidified.

That is, the thermal fusion member 210 is separated from the sealing part 121, and simultaneously, the second heat dissipation piece 222 is separated from the front end of the electrode lead 130. Here, the first dissipation piece 221 further supports the front end of the electrode lead 130 for 1 second to 5 seconds to prevent the heat remaining in the sealing part 121 from being excessively released, thereby inducing the slow solidification of the sealing part 121.

The sealing apparatus for the secondary battery comprising the above-described constituents according to the present invention may prevent the sealing part of the battery case, in which the electrode lead is provided, from being oversealed and prevent the insulation failures from occurring.

Hereinafter, a use state of the sealing apparatus for the secondary battery according to an embodiment of the present invention will be described.

Figure 3:
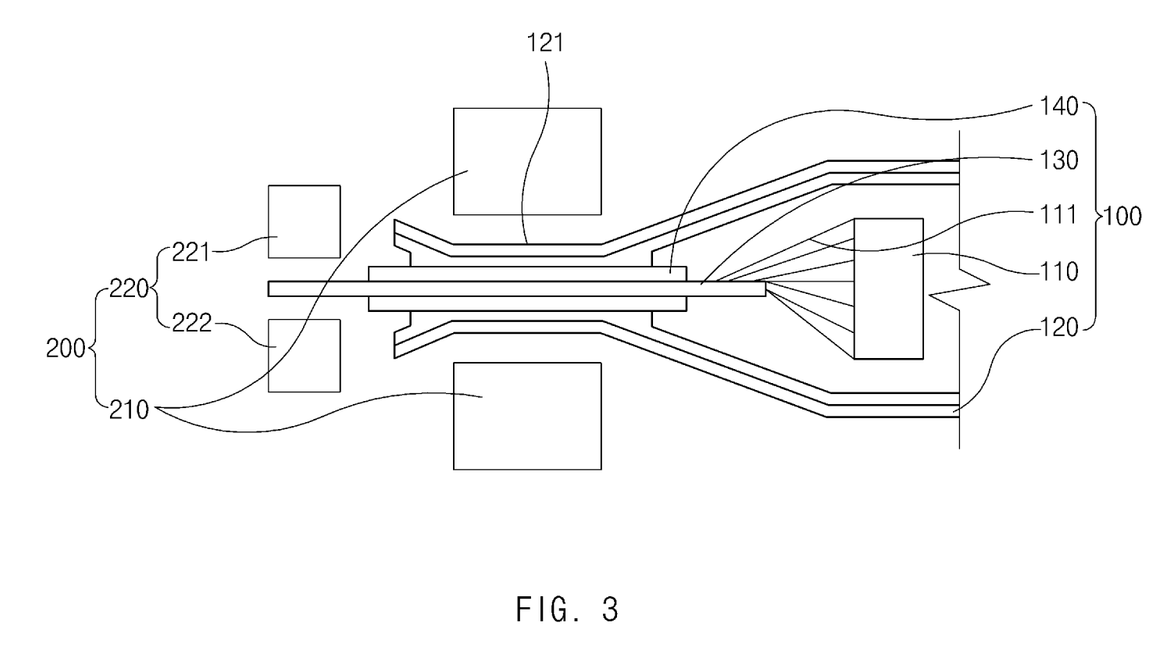
FIG. 3 is a view illustrating a sealing part thermal fusion preparation state of a battery case at which an electrode lead is disposed.

First, as illustrated in FIG. 3, the thermal fusion member 210 is disposed on the sealing part 121 of the battery case 120 in which the electrode lead 130 is provided. Simultaneously, the temperature rising prevention member 220 is disposed on the front end of the electrode lead 130. That is, the temperature rising prevention member 220 is provided with the first heat dissipation piece 221 and the second heat dissipation piece 222, which are respectively disposed on the top and bottom surfaces of the electrode lead 130. Also, the first heat dissipation piece has a temperature less than that of heat generated in the thermal fusion member 210, and the second heat dissipation piece 222 has a temperature less than that of the first heat dissipation piece 221. Here, the second heat dissipation piece 222 may have a temperature equal to or less than room temperature.

Figure 4:
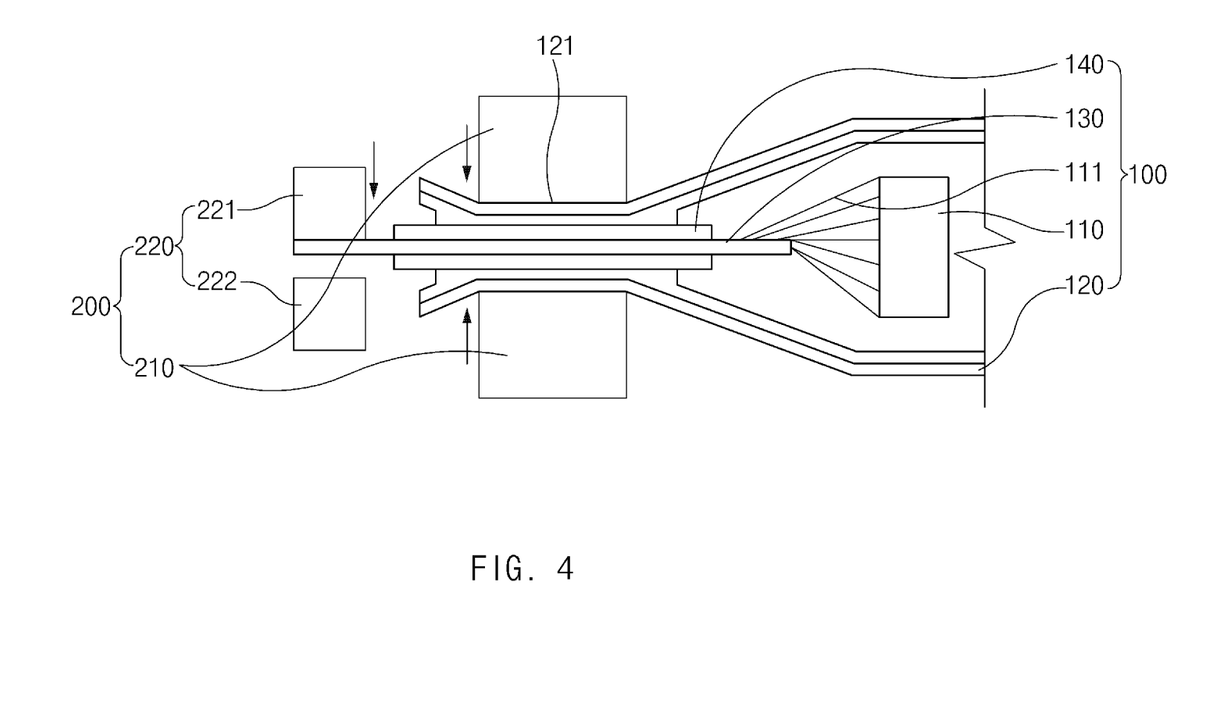
FIG. 4 is a view illustrating an initial state of thermal fusion of a sealing part of the battery case at which the electrode lead is disposed.

Then, as illustrated in FIG. 4, the sealing part 121 is thermally fused and sealed by the thermal fusion member 210, and simultaneously, the first heat dissipation piece 221 of the temperature rising prevention member 220 is supported on the top surface of the electrode lead 121 to release heat generated in the sealing part 121 to the outside through the electrode lead 121 and the first heat dissipation piece 221, thereby cooling the sealing part 121.

Figure 5:
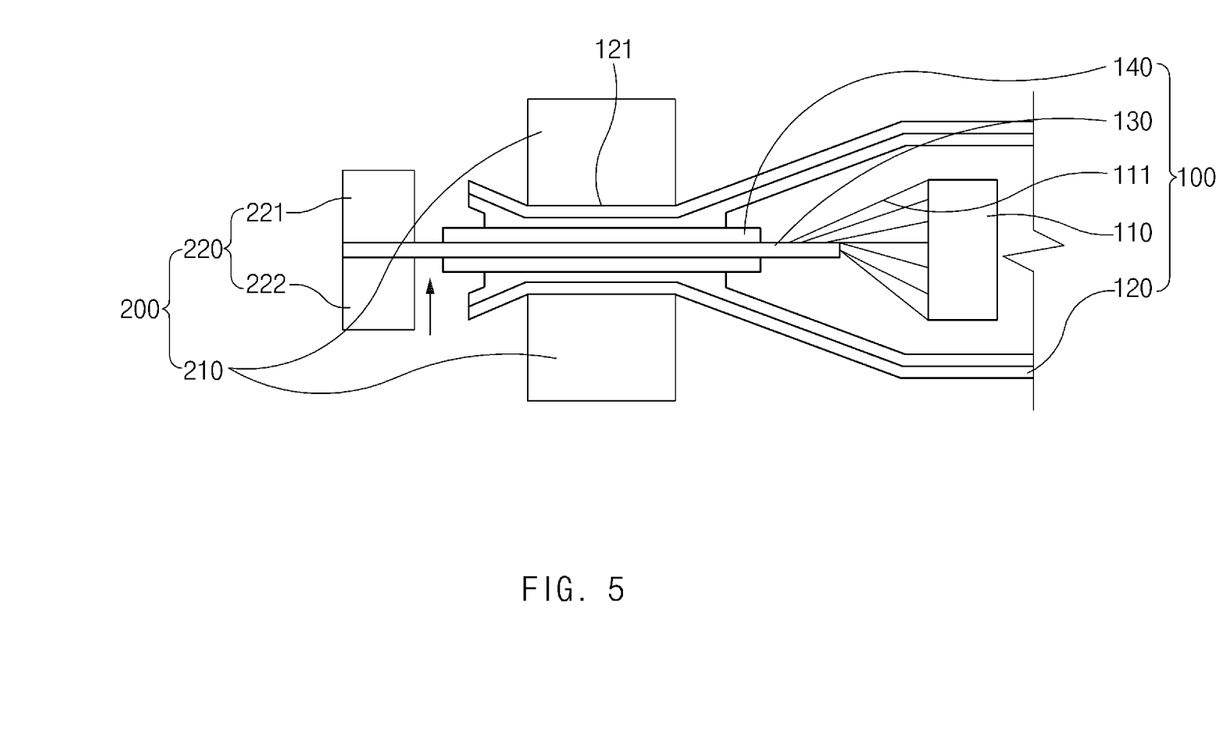
FIG. 5 is a view illustrating a latter state of the thermal fusion of the sealing part of the battery case at which the electrode lead is disposed.

Also, as illustrated in FIG. 5, when the thermal fusion member 210 thermally fuses the sealing part 121, and then, 3 seconds elapses, the second heat dissipation piece 222 is supported on the bottom surface of the electrode lead 121. Thus, the high-temperature heat generated in the sealing part 121 is quickly released to the outside through the electrode lead 121 and the second heat dissipation piece 222 to cool the sealing part 121, thereby preventing the sealing part 121 from being oversealed.

Figure 6:
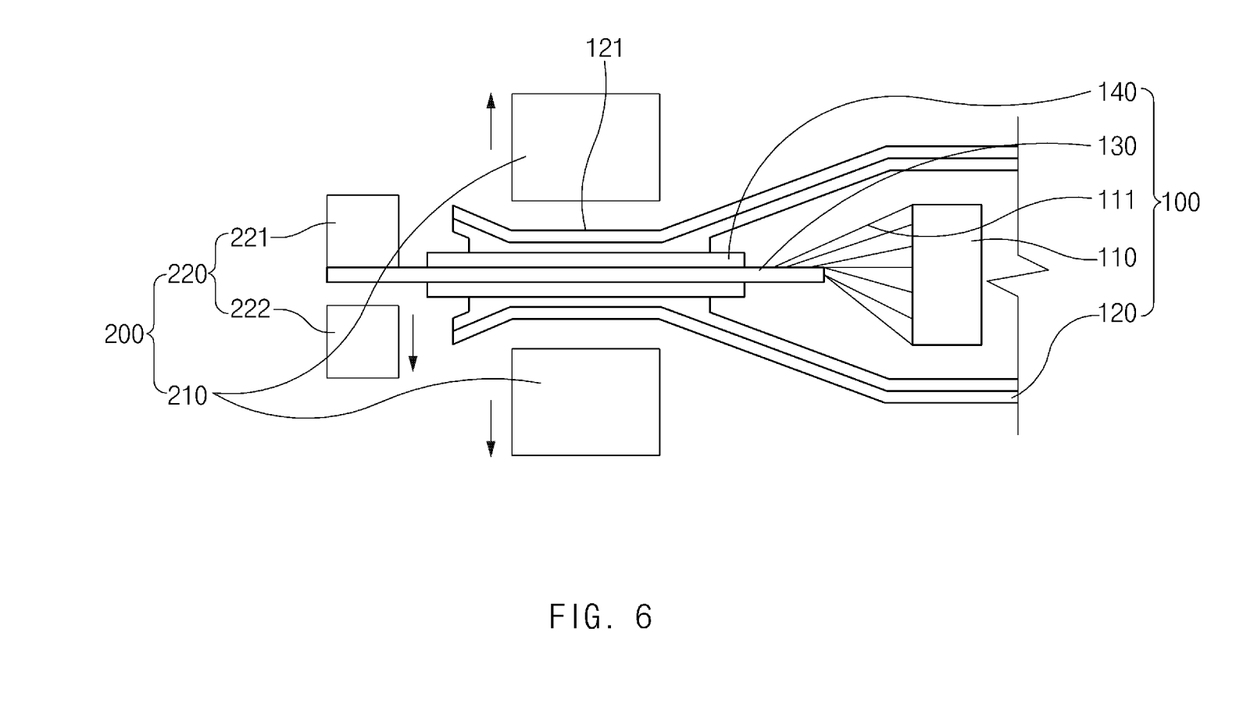
FIG. 6 is a view illustrating a state in which the thermal fusion of the sealing part of the battery case at which the electrode lead is disposed is completed.

Also, as illustrated in FIG. 6, when the sealing of the sealing part 121 is completed, the thermal fusion member 210 is separated from the sealing part 121, and simultaneously, the second heat dissipation piece 222 is separated from the electrode lead 130. Thus, the first heat dissipation piece 221 further releases the heat generated in the sealing part 121 for 1 second to 5 seconds. As a result, when the heat remaining in the sealing part 121 is completely released to the outside, the sealing part 121 is quickly solidified to deteriorate the sealability. Thus, the heat generated in the sealing part 121 is released to the outside through the first heat dissipation piece 221.

Therefore, the sealing apparatus 200 for the secondary battery according to an embodiment of the present invention may prevent the sealing part of the battery case, in which the electrode lead is provided, from being oversealed and prevent the insulation failures from occurring.

Hereinafter, in description of a sealing apparatus for a secondary battery according to another embodiment of the present invention, components having the same constituent and function as those of the foregoing embodiment have been given the same reference numeral in the drawings, and thus duplicated description will be omitted.

Figure 7:
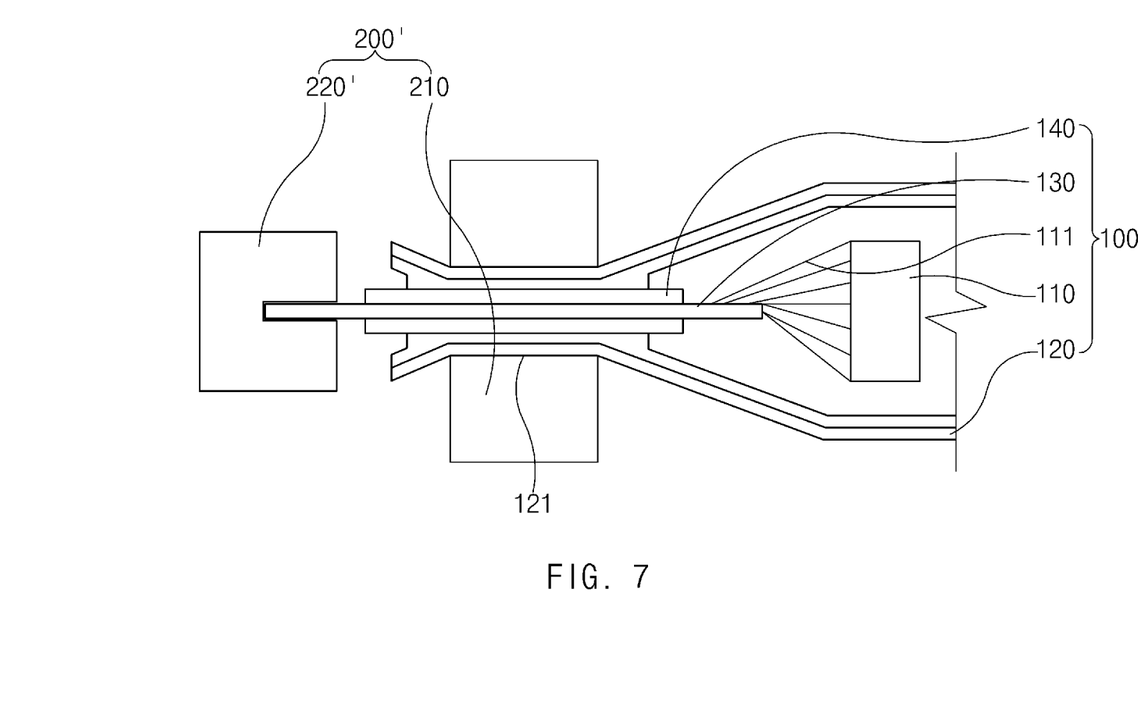
FIG. 7 is a cross-sectional view of a sealing apparatus for a secondary battery according to another embodiment of the present invention.

As illustrated in FIG. 7, a temperature rising prevention member 220' of a sealing apparatus 200' for a secondary battery according to another embodiment of the present invention may be a cooling device that cools a sealing part 121 by using cool air generated by cooling an electrode lead 130. Here, the cooling device may be largely classified into air-cooling type and water-cooling type according to a structure thereof.

That is, the temperature rising prevention member 220' may directly cool the electrode lead 130 to more effectively reduce a temperature of the sealing part 121 disposed on the electrode lead 130, particularly, to more precisely and uniformly adjust a cooling temperature of the sealing part 121.

Therefore, the sealing apparatus 200' for the secondary battery according to another embodiment of the present invention may comprise the temperature rising prevention member 220' that cools the sealing part 121 by using the cool air generated by cooling the electrode lead 130 to improve sealability and effectively prevent the sealing part 121 from being oversealed.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A sealing apparatus for a secondary battery, which seals a sealing part of a battery case at which an electrode lead coupled to an electrode assembly is disposed, the sealing apparatus comprising:
   a thermal fusion member applying heat and a pressure to the sealing part of the battery case, at which the electrode lead is disposed, to seal the sealing part; and
   a temperature rising prevention member configured to contact a front end of the electrode lead to cool the sealing part through the electrode lead, thereby preventing the sealing part from increasing in temperature,
   wherein the temperature rising prevention member includes a flat surface to contact the front end of the electrode lead.

2. The sealing apparatus of claim 1, wherein the temperature rising member conducts heat from the sealing part to the outside through the electrode lead to cool the sealing part.

3. The sealing apparatus of claim 1, wherein the temperature rising prevention member cools the sealing part by applying a cooling to the electrode lead.

4. The sealing apparatus of claim 1, wherein the flat surface of the temperature rising prevention member is maintained at a temperature less than that of the thermal fusion member.

5. The sealing apparatus of claim 1, wherein the temperature rising prevention member is provided with a first heat dissipation piece and a second heat dissipation piece,
   wherein a lower surface of the first heat dissipation piece is configured to contact an upper surface of the front end of the electrode lead, and
   wherein an upper surface of the second heat dissipation piece is configured to contact a lower surface of the front end of the electrode lead.

6. The sealing apparatus of claim 5, wherein the first heat dissipation piece has a temperature less than that of the thermal fusion member, and
   the second heat dissipation piece has a temperature less than that of the first heat dissipation piece.

7. The sealing apparatus of claim 5, wherein the first heat dissipation piece descends to contact the upper surface of the front end of the electrode lead, and after a preset time elapses, the second heat dissipation piece ascends to contact the lower surface of the front end of the electrode lead.

8. The sealing apparatus of claim 7, wherein the preset time ranges of 1 second to 5 seconds.

9. The sealing apparatus of claim 1, wherein the temperature rising prevention member maintains a contact with the front end of the electrode lead for 1 second to 5 seconds after the thermal fusion member is separated from the sealing part.

10. The sealing apparatus of claim 7, wherein the thermal fusion member is separated from the sealing part, and simultaneously, the second heat dissipation piece is separated from the front end of the electrode lead, wherein the first heat dissipation piece maintains a contact with the front end of the electrode lead for 1 second to 5 seconds to cool the sealing part.

* * * * *